United States Patent
Onose et al.

(10) Patent No.: US 7,096,587 B2
(45) Date of Patent: Aug. 29, 2006

(54) PORTABLE CIRCULAR POWER SAW WITH OPTICAL ALIGNMENT

(75) Inventors: Akira Onose, Hitachinaka (JP); Naoya Etou, Hitachinaka (JP); Shinji Takano, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 10/227,418

(22) Filed: Aug. 26, 2002

(65) Prior Publication Data
US 2003/0047050 A1 Mar. 13, 2003

(30) Foreign Application Priority Data

| Sep. 7, 2001 | (JP) | 2001-272420 |
| Sep. 7, 2001 | (JP) | 2001-272421 |
| Feb. 20, 2002 | (JP) | 2002-043517 |

(51) Int. Cl.
*B23D 45/16* (2006.01)
(52) U.S. Cl. .......................... 30/390; 83/520
(58) Field of Classification Search ............... 83/520, 83/521; 30/388–391
See application file for complete search history.

(56) References Cited

U.S. PATENT DOCUMENTS

| 2,488,947 | A | * | 11/1949 | Vavrik ..................... 30/376 |
| 4,257,297 | A | * | 3/1981 | Nidbella ..................... 83/471.3 |
| 4,450,627 | A | * | 5/1984 | Morimoto ..................... 30/391 |
| 4,982,501 | A | * | 1/1991 | Sauerwein et al. ........... 30/376 |
| 5,375,495 | A | * | 12/1994 | Bosten et al. ................ 83/520 |
| 5,461,790 | A | * | 10/1995 | Olstowski ..................... 30/391 |
| 5,517,763 | A | * | 5/1996 | Schilling et al. ............. 30/376 |
| 5,699,705 | A | * | 12/1997 | Sibbet ............................ 83/13 |
| 6,397,717 | B1 | * | 6/2002 | Waite ........................ 83/520 |
| 6,578,459 | B1 | * | 6/2003 | Waite ............................ 83/13 |
| 2001/0049988 | A1 | * | 12/2001 | Ushiwata et al. ............ 83/520 |
| 2003/0233921 | A1 | * | 12/2003 | Garcia et al. ................. 83/520 |

FOREIGN PATENT DOCUMENTS

| DE | 3406904 | * | 9/1984 |
| DE | 3922849 A1 | | 1/1991 |

* cited by examiner

*Primary Examiner*—Kenneth E. Peterson
(74) *Attorney, Agent, or Firm*—McDermott Will & Emery LLP

(57) ABSTRACT

A laser emitter projects a planer light beam to form an optical guideline on a work piece extending in a cutting direction of saw blade. The laser emitter is arranged behind, in the cutting direction, a tangential line of the circumference of the saw blade at an intersection of a bottom surface of the base and the circumference at a front side of the base in the cutting direction. The laser emitter forms the optical guideline behind the intersection in the cutting direction. The laser emitter is supported in respect of the saw blade slidingly in a direction defined by a rotation axis of the saw blade. The saw cover may have a window to transmit the laser beam toward the cutting point. A shutter selectively shutting the window may be provided.

4 Claims, 11 Drawing Sheets

FIG. 3
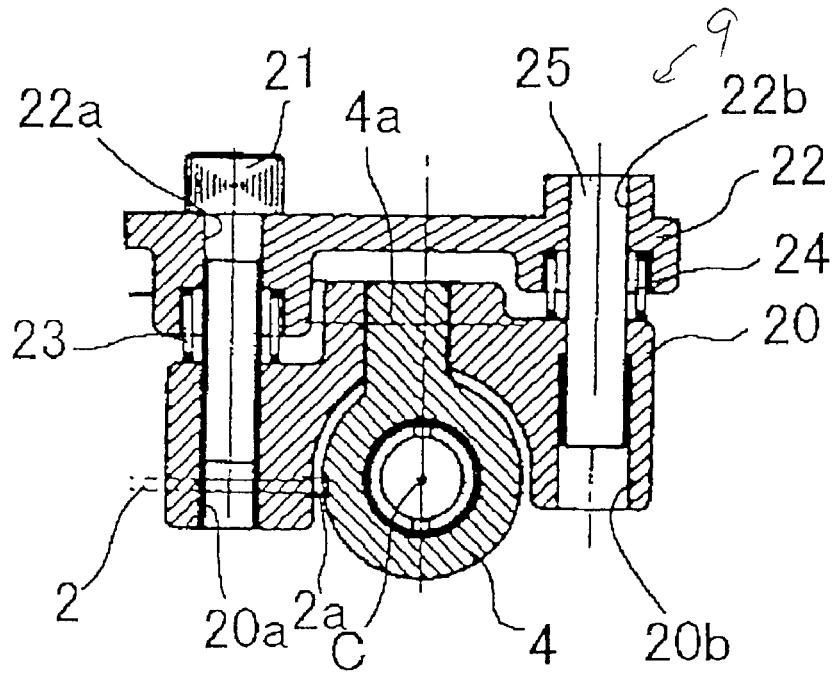
FIG. 4A
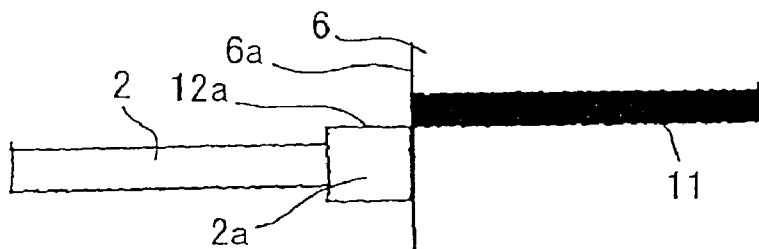
FIG. 4B
FIG. 4C
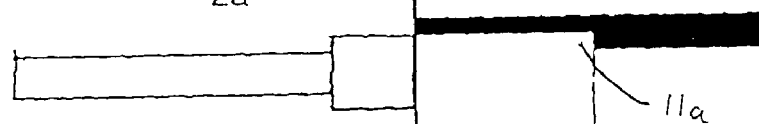
FIG. 4D
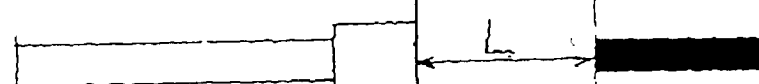
FIG. 4E
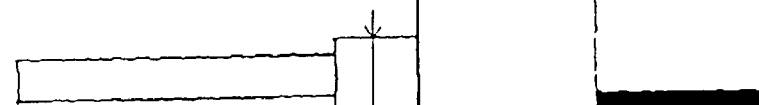
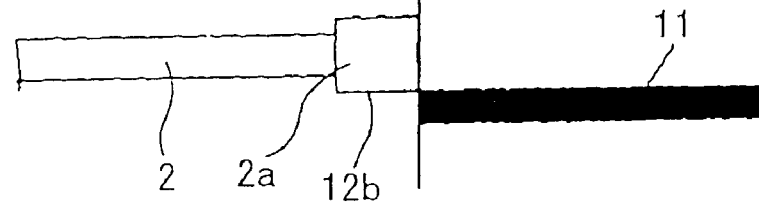

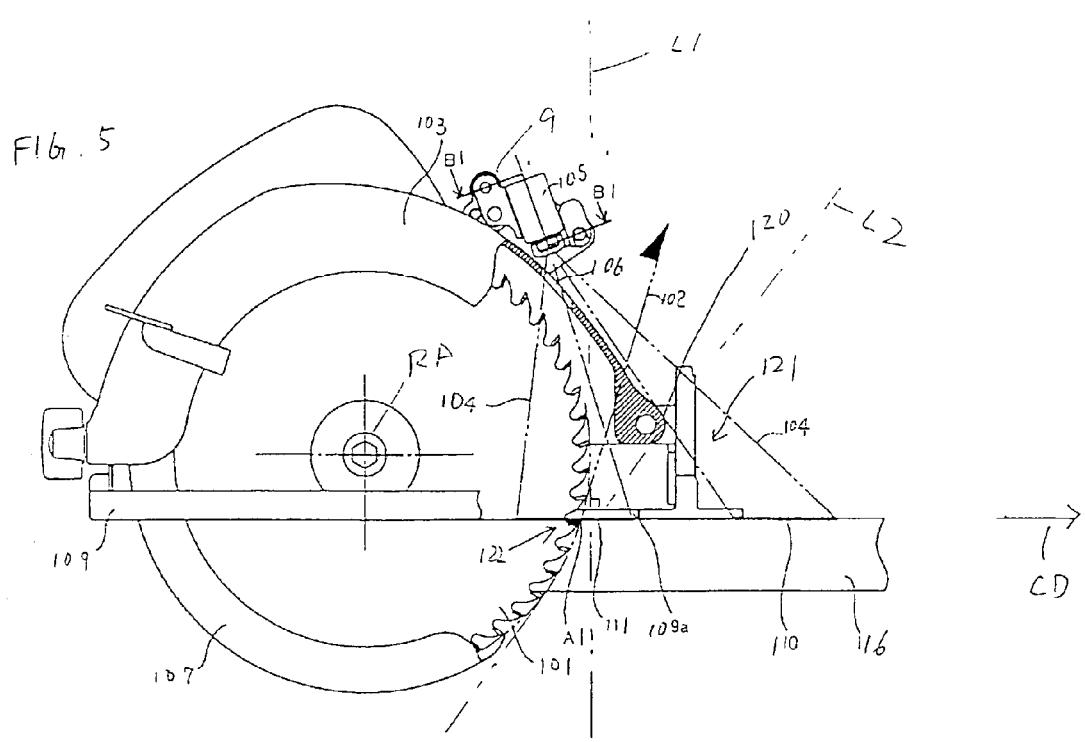

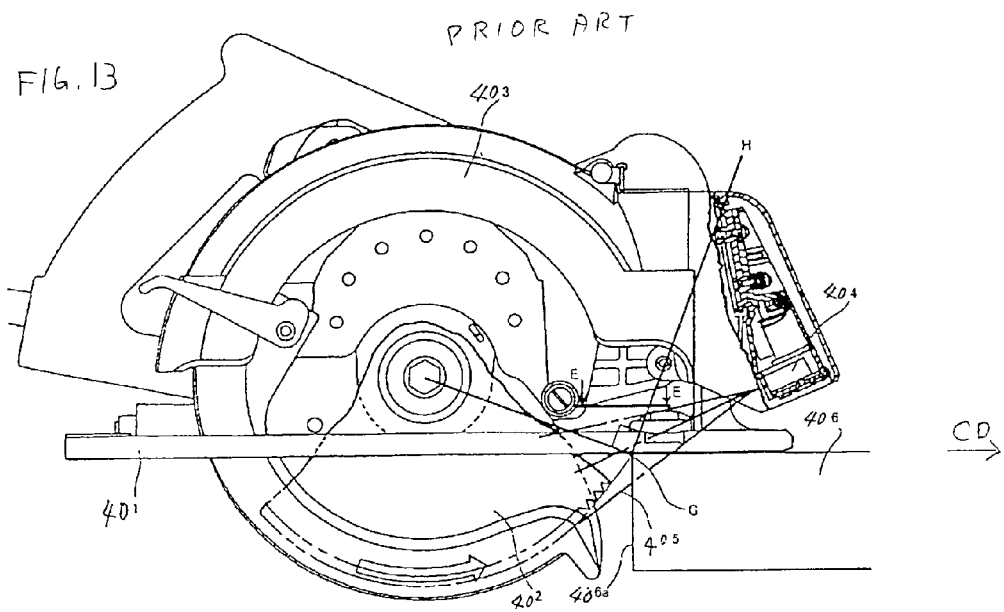
FIG. 13 PRIOR ART
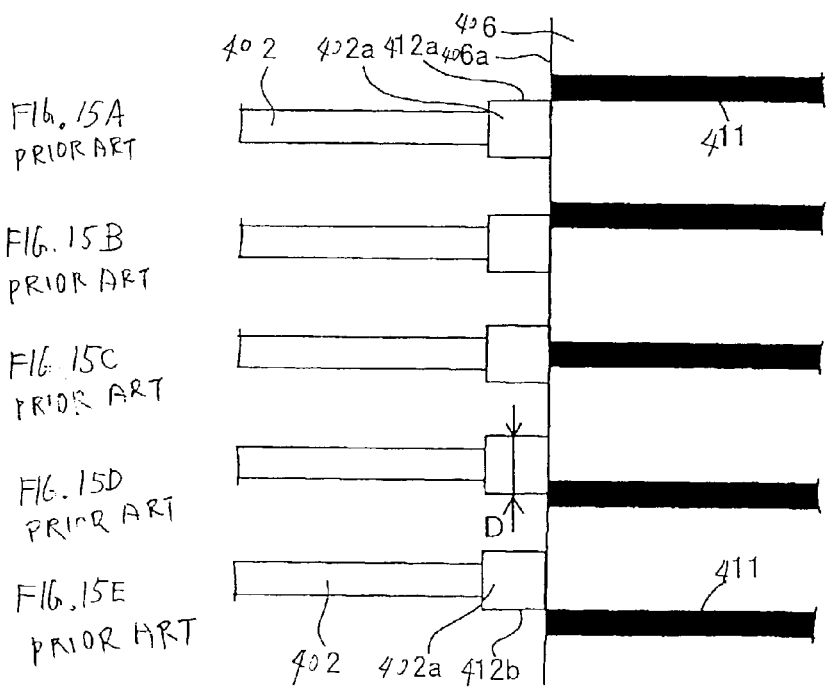
FIG. 15A PRIOR ART
FIG. 15B PRIOR ART
FIG. 15C PRIOR ART
FIG. 15D PRIOR ART
FIG. 15E PRIOR ART

PORTABLE CIRCULAR POWER SAW WITH OPTICAL ALIGNMENT

BACKGROUND OF THE INVENTION

1. Field of the Invention

This invention relates to a portable circular power saw with optical alignment.

2. Description of the Prior Art

When an operator cuts a work piece with a portable circular power saw, the operator draws a cutting line on the work piece and then cuts the work piece with aligning either side surface of the saw blade (edges) with the cutting line.

FIGS. 11 and 12 show a prior art portable circular power saw. When cutting a work piece 316 with this prior art power saw, the operator aligns an edge of a guide piece 312 with the cutting line 15 on the work piece 316 as shown in FIG. 12. Next, the operator rotates the saw blade 301 and pushes the housing forwardly (in the cutting direction) with keeping this alignment condition.

DE3922849 discloses a prior art power saw with optical alignment, wherein the optical guideline is generated on a work piece by a laser emitter. However, the optical guideline is only generated beyond the edge of the base. In other words, this prior art power saw cannot form the optical guideline near the saw blade. The optical guideline system in the power saw requires initial alignment between the saw blade and the optical guideline because the operator selects either of side surfaces of saw blade to be aligned with the cutting line on the work piece. However, in this prior art power saw, it is difficult to conduct the initial alignment between the saw blade and the optical guideline and impossible to align the cutting line with the optical guideline near the saw blade.

U.S. Pat. No. 5,375,495 discloses a portable circular power saw with optical alignment system capable of aligning the optical guideline with the saw blade and with a cutting line near the cutting point.

FIG. 13 shows a side elevation view of this prior art circular power saw with optical alignment system. The laser emitter 404 is arranged, in the cutting direction, in front of the tangential line H at an intersection G of the circumference of the saw blade 402 and the bottom surface of the base 401. The laser emitter 404 emits laser light beam 405 such that a light path of the laser beam 405 contacts the saw blade 402. Moreover, the laser emitter 404 can shift in the direction parallel to the rotation axis of the saw blade 402 to emit the laser beam 405 to align the optical guideline 411 on the work piece 406 generated by the laser beam 405 with either of the side surface 412a or 412b of the saw blade 402.

FIGS. 14A and 14B show alignment conditions in this prior art power saw.

The operator adjusts the position of the laser emitter 404 in either of condition shown in FIG. 14 or 14B in accordance with that the operator intends to cut the work piece 406 on either side of the saw blade 402.

FIGS. 15A to 15E illustrate sectional views shown in the direction E in FIG. 13. FIG. 15A shows an alignment condition of the laser emitter 404, wherein one side surface 412a of the edge portion 402a of the saw blade 402 is aligned with the optical guideline 411. FIG. 15E shows an opposite alignment condition of the laser emitter 404, wherein the other side surface 412b of the edge portion 402a of the saw blade 402 is aligned with the optical guideline 411. FIGS. 15B to 15D show the intermediate alignment conditions between those in FIG. 15A and FIG. 15E. In these alignment conditions, all guideline images have no shadow image of edges of the saw blade on the work piece 406 because the laser emitter 404 is arranged in front of the tangential line H in the cutting direction CD.

This alignment operation is done with the edge of the work piece 406 contacting the edge portion 402a of the saw blade 402 to obtain either of alignment condition shown in FIG. 16A or FIG. 16E.

In this prior art power saw, because the laser emitter 404 is arranged in front of the tangential line H, in order to align the laser beam 405 with either of side surface 412a or 412b, the operator should visually observe the positional relation between the edge portion 402a and the guideline 411 on the work piece 406 with shifting the laser emitter 404 in the direction of the rotation axis of the saw blade 402.

FIGS. 16 and 17 show a portion of the saw blade 402, wherein FIG. 17 shows a side elevation view of the saw blade 402 shown in the direction F in FIG. 16. In FIGS. 16 and 17, each pair of successive edges on the saw blade have different forms and protrudes in opposite directions, and are alternately arranged around the circumference of the saw blade 402. Thus, the resultant cutting width becomes D that is a distance between the both sides of the edges 412a and 412b. In the above-mentioned alignment condition, the optical guideline 411 can be aligned with one side surface 412a of an edge 402a of the saw blade 402 contacting the edge of the work piece 406. On the other hand, the guideline 411 cannot be aligned with the other side surface 412b of edge 402b at the same rotary position of the saw blade 402 because the edge 402b protrudes in the opposite direction to the edge 402a and the edge 402b cannot contact the edge of the work piece 406 in that condition. This was inconvenient.

Moreover, the operator can easily observe the side sight of the saw blade 402 opposite to the motor because of no obstacle structure. On the other hand, the operator cannot easily observe the other side (the side of housing) of the saw blade 402 because the structure blocks the sight.

SUMMARY OF THE INVENTION

The aim of the present invention is to provide a superior portable circular power saw with optical alignment.

According to the present invention, a first aspect of the present invention provides a portable circular power saw comprising:

a housing;

a motor supported by said housing for rotating an attachable saw blade for cutting a work piece;

a base supported by said housing having an opening to expose a first portion of said circular saw blade from said base;

a saw cover supported by said housing base for covering a second opposite portion of said saw blade;

supporting means; and light projection means supported by said supporting means for projecting a planer light beam to form an optical guideline on said work piece extending in a cutting direction of saw blade, wherein said light projection means is arranged behind, in said cutting direction, a tangential line of said circumference of said saw blade at an intersection of a bottom surface of said base and said circumference at a front side of said base in said cutting direction, and said light projection means is capable of forming said optical guideline behind said intersection in said cutting direction, and wherein said supporting means supports said light projection means in respect of said saw blade slidingly in a direction defined by a rotation axis of said saw blade.

The base has an edge extending in a direction perpendicular to said cutting direction with a predetermined distance from said rotation axis. The light projection means may be capable of forming said optical guideline beyond said edge in said cutting direction.

The light projection means may be arranged on a surface of said saw cover opposite to said saw blade, said saw cover has a window transparent in respect of said planer light beam with a size and a position so as to form said optical guideline on said work piece through said window. Moreover, the base has an edge extending in a direction perpendicular to said cutting direction with a predetermined distance from said rotation axis. The window may transmit a first portion of said planer light beam and a second portion of said planer light beam may be directly projected beyond said edge in said cutting direction.

According to the present invention, a second aspect of the present invention provides a portable circular power saw comprising:

a housing;

a motor supported by said housing for rotating an attachable saw blade for cutting a work piece;

a base supported by said housing having an opening to expose a first portion of said circular saw blade from said base;

a saw cover supported by said housing on the opposite side of said base for covering a second opposite portion of a circumference of said saw blade; and light projection means attached to said saw cover housing for projecting a planer light beam to form an optical guideline on said work piece extending in a cutting direction of saw blade, wherein said saw cover has a window transparent in respect of said planer light beam with a size and a position so as to form said optical guideline on said work piece through said window.

The light projection means may be attached to a surface of said saw cover opposite to said saw blade.

The window may comprise a through hole.

The light projection means may be attached to an inner surface of said saw cover on the side of said saw blade and said window may transmit said light beam therethrough outwardly.

The inner surface of the saw cover may have a hollow portion outwardly protruding in a radial direction of said saw blade to contain said light projection means.

Moreover, a loaded safety cover rotatably supported around said circumference of said saw blade may be provided inside said saw cover for safety covering a portion of said saw blade during non-cutting operation and rotatably shifting under said light projection means during cutting operation, wherein said safety cover has a window for transmitting said light beam from said window of said saw cover therethrough during said cutting operation.

Moreover, a supporting means for supporting said light projection means may be provided in respect of said saw blade slidingly in a direction defined by a rotation axis of said saw blade and a locking mechanism for locking said light projection means at a given position within a predetermined sliding range.

Moreover, an externally operable shutter with a supporting mechanism for selectively shutting said window may be provided.

According to the present invention, a third aspect of the present invention provides a portable circular power saw comprising:

a housing;

a motor supported by said housing for rotating an attachable saw blade for cutting a work piece;

a base supported by said housing having an opening to expose a portion of said circular saw blade from said base;

a saw cover supported by said housing for covering a second opposite portion of a circumference of said saw blade; and light projection means attached to a surface of said saw cover opposite to said saw blade for projecting a planer light beam to form an optical guideline on said work piece extending in a cutting direction of saw blade, wherein said saw cover has a window transparent in respect of said planer light beam with a size and a position so as to form said optical guideline on said work piece through said window and an externally operable shutter for selectively shutting said window.

The saw cover may have a sliding mechanism for slidingly supporting said shutter.

Moreover, a laser cover arranged on a surface of said saw cover opposite to said saw blade may be further provided. The laser cover may have a through hole for transmitting said light beam through said through hole outwardly with respect to a side of said saw blade to form another optical guideline on said work piece, wherein said shutter is accessible through said through hole.

The portable circular power saw based on the first aspect, may further comprise an externally operable shutter for selectively shutting said window.

The portable circular power saw based on the second aspect, may further comprise supporting means, wherein said light projection means is arranged behind, in said cutting direction, a tangential line of said circumference of said saw blade at an intersection of a bottom surface of said base and said circumference at a front side of said base in said cutting direction, and said light projection means may be capable of forming said optical guideline behind said intersection in said cutting direction, and wherein said supporting means may support said light projection means in respect of said saw blade slidingly in a direction defined by a rotation axis of said saw blade and holding said light projection means at any given position within a predetermined sliding range.

The portable circular power saw based on the third aspect, may further comprise supporting means, wherein said light projection means may be arranged behind, in said cutting direction, a tangential line of said circumference of said saw blade at an intersection of a bottom surface of said base and said circumference at a front side of said base in said cutting direction, and said light projection means may be capable of forming said optical guideline behind said intersection in said cutting direction, and wherein said supporting means may support said light projection means in respect of said saw blade slidingly in a direction defined by a rotation axis of said saw blade and hold said light projection means at any given position within a predetermined sliding range.

BRIEF DESCRIPTION OF THE DRAWINGS

The object and features of the present invention will become more readily apparent from the following detailed description taken in conjunction with the accompanying drawings in which:

FIG. 3 shows a sectional view of a slidingly supporting mechanism, taken on the line B—B in FIG. 1;

FIGS. 4A to 4E illustrate alignment conditions of the potable circuit power saw according to the first embodiment;

FIG. 5 is a side elevation view of the portable circular power saw in accordance with a second embodiment;

FIG. 13 is a side view of another prior art circular power saw with optical alignment system;

FIGS. 15A to 15E illustrate sectional views shown in the direction E in FIG. 13;

The same or corresponding elements or parts are designated with like references throughout the drawings.

DETAILED DESCRIPTION OF THE INVENTION

FIRST EMBODIMENT

Figure 1:
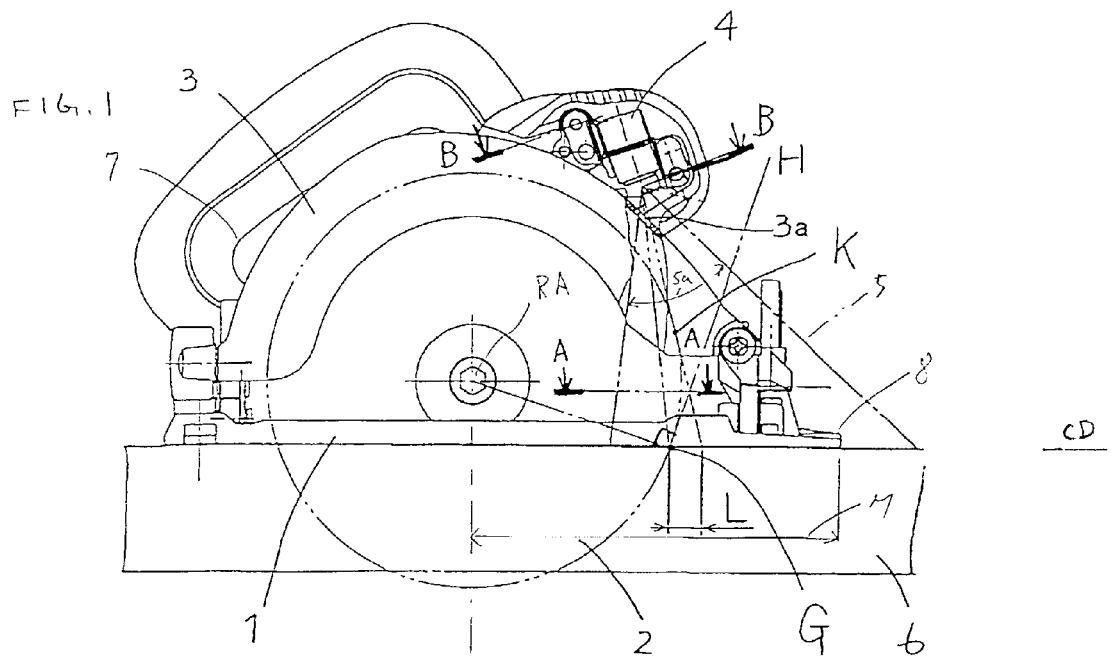
FIG. 1 is a side elevation view, partially a cut view, of a potable circular power saw according to a first embodiment.

FIG. 1 shows a portable circular power saw with optical alignment. It comprises: a housing 7, a motor (not shown) supported and contained by the housing 7 for rotating an attachable circular saw blade 2 for cutting a work piece 6, a base 1 supported by the housing 7 having an opening to expose a first portion of the circular saw blade 2 from the base 1, a saw cover 3 supported by the housing 7 for covering a second opposite portion of the saw blade, and a laser emitter 4 as a light projection means supported in respect of the housing 7 for projecting a planer light beam 5 to form an optical guideline 11 on the work piece 6 extending in a cutting direction CD of the saw blade 2.

The laser emitter (oscillator) 4 is arranged on the outer surface of the saw cover 3 (on the surface opposite to the saw blade 2) so as to direct the laser beam 5 to a plane defined by the bottom surface of the base 1 (an upper surface of a work piece 6) to form an optical guideline 11 extending in the cutting direction CD. More specifically, the laser emitter 4 is arranged behind, in the cutting direction CD, a tangential line H of the circumference of the saw blade 2 at an intersection G of a bottom surface of the base 1 and the circumference at a front side of the base 1 in the cutting direction CD and is capable of forming the optical guideline 11 behind the intersection G in the cutting direction and at or beyond the edge 8 of the base 1 to have a radiation angle range 5a in the cutting direction CD.

In this embodiment, the base 1 has an edge 8 extending in a direction perpendicular to the cutting direction CD with a predetermined distance (M in the cutting direction) from the rotational axis RA of the saw blade 2. The laser emitter 4 is capable of forming the optical guideline 11 at and beyond the edge 8 in the cutting direction CD.

The saw cover 3 has a window 3a that can transit the laser beam 5 therethrough to form the optical guideline 11 adjacent to the intersection G. A second portion of the laser beam 5 transmits along the outer surface of the saw cover 3 and hits the work piece 6 to form another part of optical guideline 11 formed at or beyond the edge 8 of the base 1.

The laser emitter 4 has a laser diode for emitting a coherent laser beam and a toric lens for expanding the transmitting direction to form a planer laser beam 5 extending in the cutting direction CD for example.

The laser emitter 4 can form the optical guideline 11 extending in the cutting direction behind the intersection G. The Teaser emitter 4 can be adjustably shifted in a direction of the rotation axis RA of the saw blade 2 with a slidingly supporting mechanism 9.

FIG. 3 shows a sectional view of the slidingly supporting mechanism 9, taken on the line B—B in FIG. 1.

FIG. 3 also illustrates the positional relation of the saw blade 2 and the laser emitting point C of the laser emitter 4. That is, the laser beam emitting point C is aligned with one side surface 12a (housing side). The laser emitter 4 is fixed to a sliding member 20 with a mount 4a. The sliding member 20 has screw holes 20a and a through hole 20b at both edges thereof. A bolt 21 piercing through a through hole 22a in a fixing member 22 fixed to the saw cover 3. Between the sliding member 20 and the fixing member 22, coil springs 23 and 24 are arranged. Thus, the sliding member 20 is spring-loaded such that the fixing member 22 always pushes the sliding member 20. The fixing member 22 has a through hole 22b in which a pin 25 is pressed and slidingly pierces a through hole 20b in the fixing member 22.

When the bolt 21 is turned in the fastening direction, the sliding member 20 shifts in a closer direction to the fixing member 22. Thus, the position of the laser emitter 4 is adjustable in the direction parallel to the rotation axis RA of the saw blade 2. When the bolt 21 is turned to the loosening direction, the sliding member 20 shifts in the away direction from the fixing member 22. Thus, the position of the laser emitter 4 can be adjusted.

As mentioned above, the portable circular power saw comprises the fixing member 22, the pin 25, and the sliding member 20 as the supporting means for supporting the laser emitter 4 as the light projection means in respect of said saw blade 2 slidingly in a direction defined by a rotation axis RA of the saw blade 2 and the bolt 21 and the coil springs 23 and 24 as a holding mechanism for holding the light projection means at a given position within a predetermined sliding range.

Figure 2:
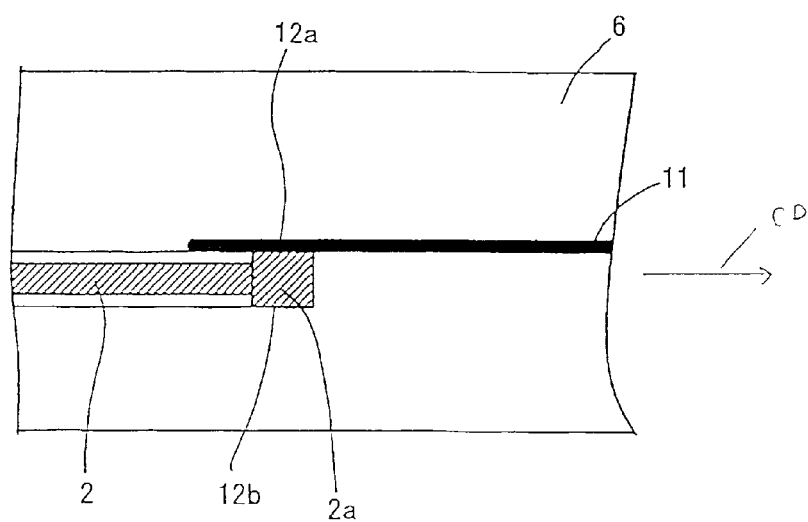
FIG. 2 illustrates an alignment condition of the potable circuit power saw according to the first embodiment.

FIG. 2 shows the positional relation of the optical guideline 11 and the saw blade 2 in the condition that the laser emitting point C is aligned with the one side surface 12a of the edge portion 2a. Turing the bolt 21 in the loosening direction from this condition, the laser emitting point C of the laser beam 4 can be aligned with the center of the saw blade 2 or the other side surface of the saw blade 2.

The coil spring 23 is also provided to prevent vibrations developed, during cutting, between a small space between the thread of the bolt 21 and thread of the screw hole 20a.

FIGS. 4A to 4E show positional relations between the saw blade 2 and the optical guideline 11. In FIG. 4A, the optical guideline 11 is aligned with one side surface 12a of the edge portion 2a. In other words, the planer laser beam 5 is aligned with one side surface 12a of the edge portion 2a. In FIG. 4E, the optical guideline 11 is aligned with the other side surface 12b of the edge portion 2a. In other words, the planer laser beam 5 is aligned with the other side surface 12b of the edge portion 2a. FIGS. 4B to 4D show intermediate positional relations as the bolt 21 is successively turned in the loosening direction. That is, the slidingly supporting mechanism 9 supports the laser emitter 4 in respect of the saw blade 2 slidingly in a direction defined by a rotation axis RA of the saw blade and holds the laser emitter 4 at any given position within a predetermined sliding range.

During this alignment, the optical guidelines 11 in FIGS. 4B to 4D have shadows 11a of the edge portion 2a over a length L. That is, the edge portion 2a stops a portion of the laser beam 5 behind, in the cutting direction, the point K where the laser beam 5 tangentially contacts the edge of the edge portion 2a. The shadowing the laser beam 5 provides positional information of both side surfaces 12a and 12b of the edge portion 2a at any rotary position of the saw blade 2.

This operation is provided by the structure that the laser beam 5 is projected behind, in the cutting direction CD, the tangential line H at the intersection G between the bottom surface of the base 1 and the circumference of the saw blade 2 and the laser emitter 4 can be shifted in the direction parallel to the rotation axis RA of the saw blade 2.

The shadows 11a in FIGS. 4B to 4D are generated by that several edges 2a above the intersection G stop a portion of the laser beam 5. Thus, if the image of the optical guideline 11 includes a shadow 11a, the laser beam 5 is located within the width D of the edge portion 2a.

Figure 16:
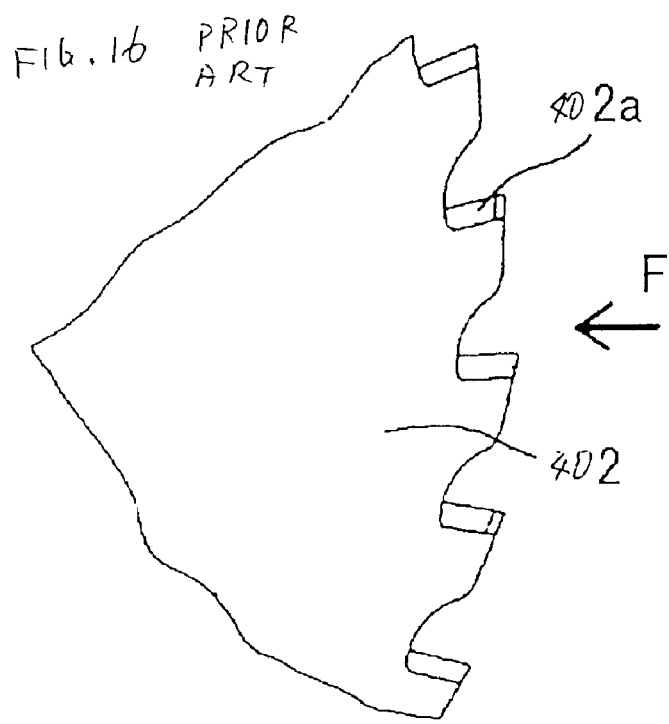
FIG. 16 is a partial side elevation of a prior art saw blade.
Figure 17:
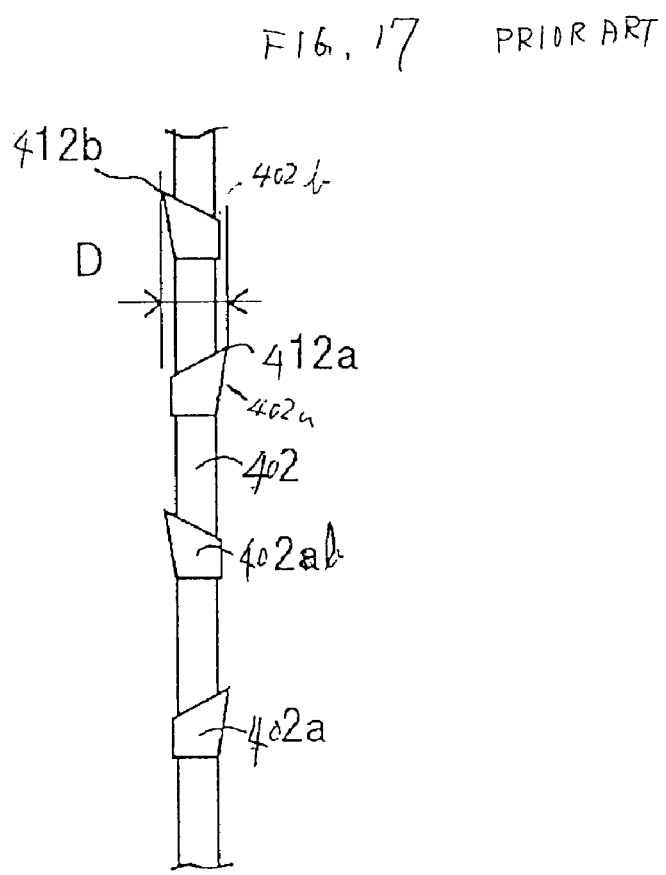
FIG. 17 is a partial front view of the prior art saw blade shown in the direction F in FIG. 16.

Thus, in this portable circular power saw according to this embodiment, when the optical guideline 11 is aligned with either of side surfaces 12a and 12b, the operator observes whether the optical guideline 11 has a shadow 11a or not within the length L as shifting the laser emitter 4 in the direction of the rotational axis RA of the saw blade 2. Thus, the operator is not required to directly observe the side surface 12a or 12b. This operation provides positional information of both side surfaces 12a and 12b of the edge portion 2a in the image of the optical guideline 11 at any rotary position of the saw blade 2. Thus, though the saw blade 2 has edges shown in FIGS. 16 and 17, wherein each pair of successive two edges on the saw blade have different forms and protrudes in the opposite directions alternately, the laser beam 5 is partially stopped to have guideline 11 with the shadow 11a when the laser beam 5 is located within the width D of the edge portion 2a. Thus, the operator can adjust the optical guidelines 11 with observing the shadow 11a in the optical guideline 11.

Moreover, because the operator is not required to observe the side surface 12a or 12b together with the guideline 11 at the same time, that is, the operator is required to only observe the shape of the optical guideline 11, the operator can observe the guideline 11 slantwise, not just above the edge portion 12a on the plane of the saw blade 2. Thus, the operator can easily observe the guideline 11 at the place behind, in the cutting direction CD, the intersection G.

After the initial alignment of the laser either 4 with either of side surfaces of the saw blade 2, the operator aligns the optical guideline 11 with a cutting line (not shown) on the work piece 6 to cut the work piece 6.

In this embodiment, the laser emitter 4 is arranged on the surface of the saw cover 3 opposite to the saw blade 2 and the window 3a is provided in the saw cover 3 to allow the laser beam 5 to transmit therethrough to form the guideline 11 behind the intersection G in the cutting direction CD. However, the laser emitter 4 may be arranged inside the saw cover 3, on the side of the saw blade 2.

In the above-mentioned embodiment, the laser emitter 4 is slidingly shifted in the direction of the rotational axis RA. However, the position of the laser emitter may be adjusted in the direction of the rotational axis RA by a rotating mechanism and a mechanism keeping the perpendicular direction to the rotation axis RA. For example, a pantograph mechanism provides this type of position adjustment.

SECOND EMBODIMENT

FIG. 5 shows a portable circular power saw in accordance with a second embodiment. The structure of this portable circular power saw is substantially the same as that of the first embodiment. The difference is in that the laser emitter 105 is arranged on the upper surface of the saw cover 103 at a position behind, in the cutting direction CD, a tangential line L2 of the circumference of the saw blade 2 intersecting with a connection point 120 between the edge 121 of the base 109 and the end of the saw cover 103 to project the laser beam 104 at the cutting point on the upper surface of the work piece 116 through a window 106 from the laser emitter 105.

Moreover, the laser emitter 105 is arranged behind, in the cutting direction CD, a tangential line L1 of the circumference of the saw blade 2 perpendicular to the bottom surface of the base 1 or the upper surface of the work piece 116. This is because during cutting, cutting chips are hit and fly along the tangential line 102. The inclination of the tangential line 102 varies with the thickness of the work piece 116. If a work piece 116 with the possible greatest thickness is cut, cutting chips are hit substantially perpendicularly to the base 1. Thus, positioning the laser emitter 105 on the saw cover 103 behind the perpendicular line L1 in the cutting direction CD prevents cutting chips from sticking to the laser beam emitting point of the laser emitter 105 if the window 106 is a through hole, and prevents chips from sticking to the window 105, if the window 105 is provided a transparent material such as a clear plastic plate.

In this embodiment there is a further d difference in that a safety cover 107 is further provided. The safety cover 107 is rotationally supported in respect of the rotational axis RA of the saw blade 101 around the circumference of the saw blade 101 to cover a portion of the saw blade 101 on the cutting side, wherein the safety cover 107 rotationally slide around the circumference of the saw blade 101 between the saw cover 103 and the saw blade 101 as the end of work piece 116 enters the cutting area. On the initial alignment, i.e., when the position of the laser emitter 105 is aligned with one of side surfaces of the edge portion of the saw blade 101, the work piece 116 is positioned to have contact of its edge with the edge portion of the saw blade 101. Thus, as shown in FIG. 5, the safety cover 107 does not stop the laser beam 104 transmitted through the window 106 in the non-cutting condition. Thus, this embodiment provides a favorable initial alignment of the optical guidelines 110 and 111 with one of side surface of the edge portion of the saw blade 101 with the slidingly supporting mechanism 9.

THIRD EMBODIMENT

Figure 6:
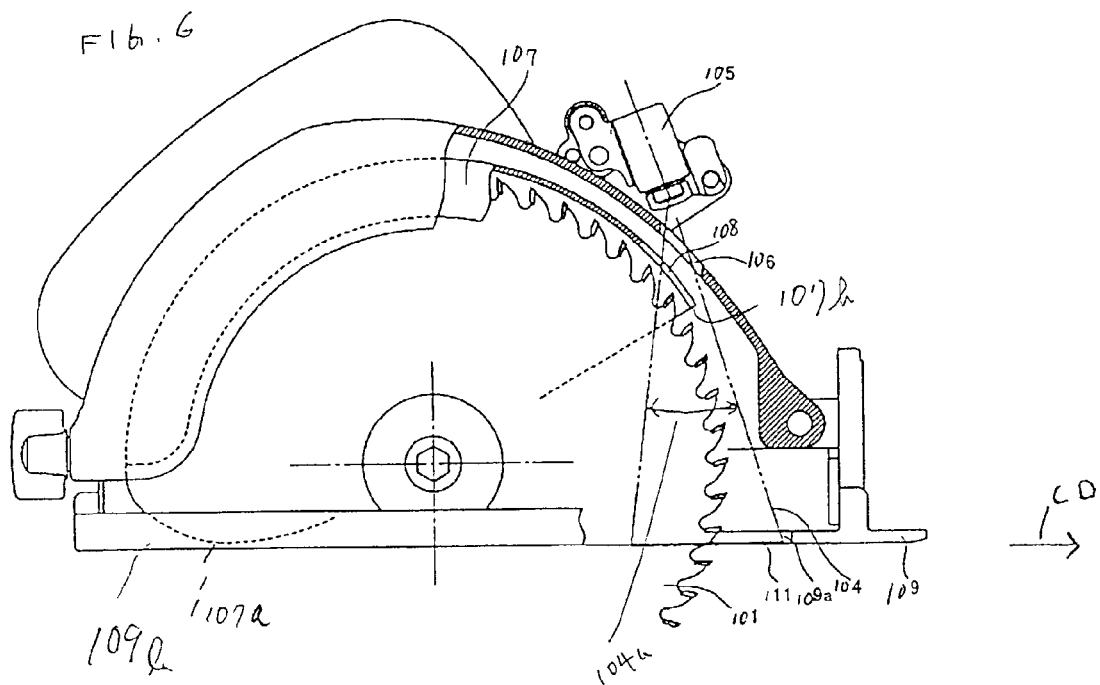
FIG. 6 is a side elevation of the portable circular power saw according to a third embodiment.

FIG. 6 shows a portable circular power saw according to a third embodiment. The structure of this portable circular saw has substantially the same structure as that of the second embodiment. The difference is in that the safety cover 107 has a window 108 at a position entering the laser beam radiation range 104a when the safety cover 107 is rotated around the circumference of the saw blade 101 during cutting.

More specifically, during cutting, one end 107a of the spring loaded safety cover 107 is pushed by the edge of work piece 116 as the saw blade 101 enters the work piece 116. When the edge of the work piece 116 reaches the end portion 109b of the base 109, the safety cover 107 has a maximum rotation angle and holds this condition thereafter. In this condition, the other end 107b of the safety cover 107 enters the laser beam radiation angle range 104a. Thus, the window 108 is provided to allow the laser beam 104 to pass through the window 108. In this embodiment, the window 108 comprises a through hole. Alternatively, a transparent member that can transmit the laser beam 104 provides the window 108. Moreover, the whole of the safety cover 107 may be made of a transparent plastic member.

This embodiment is applicable to the first and second embodiments.

FOURTH EMBODIMENT

Figure 7:
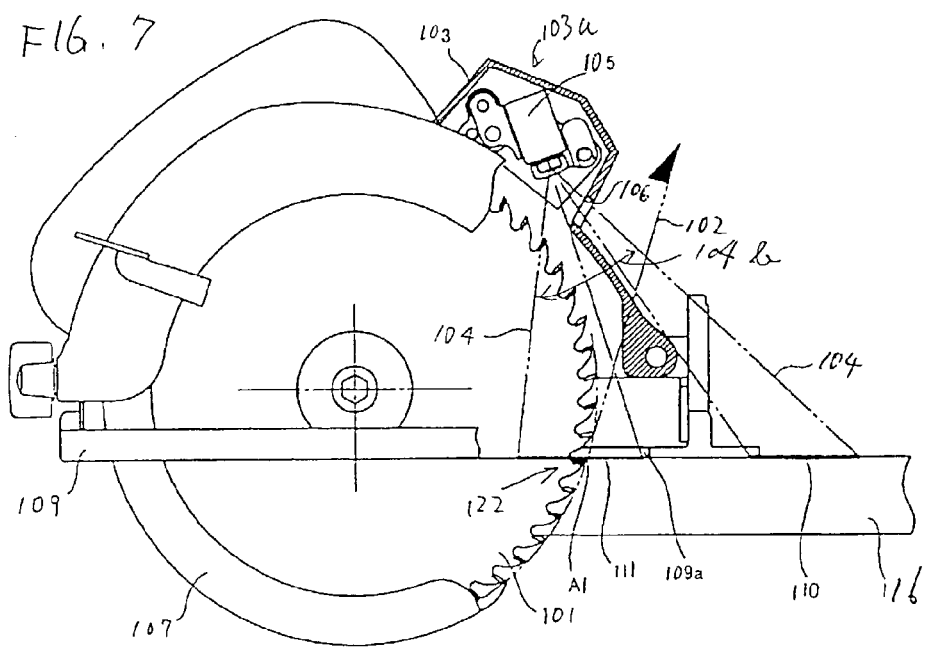
FIG. 7 is a side elevation of the portable circular power saw according to a fourth embodiment.

FIG. 7 shows the portable circular power saw according to a fourth embodiment. This portable circular saw has substantially the same structure as that of the second embodiment. The difference is in that the laser emitter 105 is mounted on and inside the saw cover 103, that is, the laser emitter 105 is mounted on the side of the saw blade 101 from the saw cover 103. The laser emitter 105 has a radiation angle range 104b of the laser beam 104b covering the portion adjacent to the cutting point 122 with the optical guideline 111 and the portion in front (in cutting direction CD) of the base 1 with the optical guideline 110. The optical guideline 111 is formed by direct transmission of the laser beam 104 through the space inside the saw cover 103 and the optical guideline 110 is formed by transmission of the laser beam 104 through a window 106 formed in the saw cover 103. That is, the laser emitter 105 is attached to an inner surface of the saw cover 103 on the side of the saw blade 101 and the window 106 transmits the laser beam 104 therethrough outwardly. The saw cover 103 has a hollow portion 103a outwardly protruding in a radial direction of the saw blade 101 to contain the laser emitter 105.

FIFTH EMBODIMENT

Figure 8:
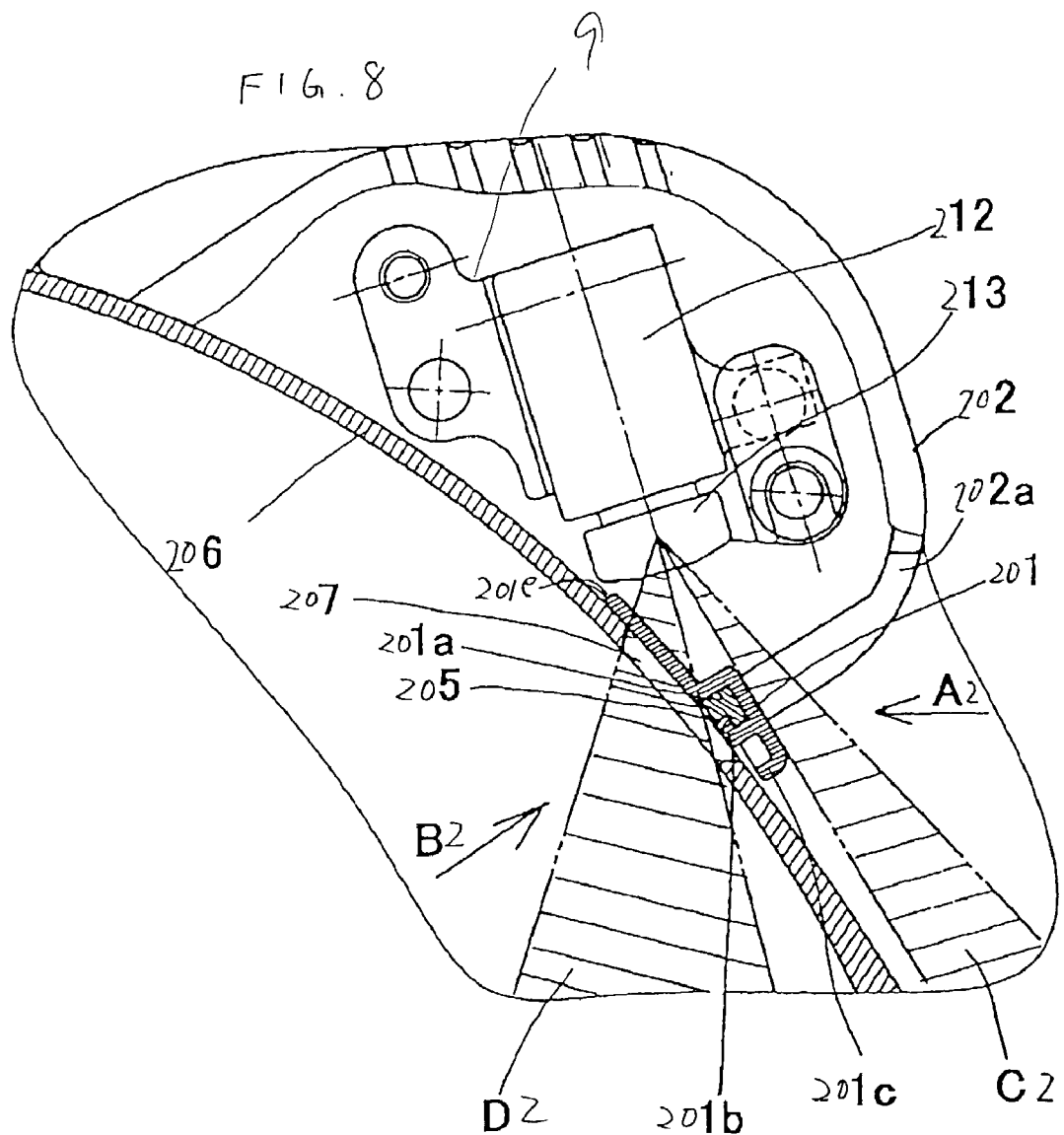
FIG. 8 is a partial sectional view of the portable circular power saw according to a fifth embodiment.

FIG. 8 shows a laser emitter 212 and its peripheral portion of the portable circular power saw according to a fifth embodiment. The structure of this portable circular saw has substantially the same structure as that of the third embodiment. The difference is in that the window 207 in the saw cover 206 has a slide cover 201. The slide cover 201 selectively covers the window 207 to prevent the cutting chips from attaching to the laser beam emitting point 213 of the laser emitter 212.

More specifically, a laser cover 202 is arranged on the upper surface of the saw cover 206. The laser emitter 212 has a laser beam radiation angle range covering the portion adjacent to the cutting point and the portion in front (in cutting direction CD) of the base in the same way as the fourth embodiment. The laser emitter 212 is fixed to the laser cover 202 through the slidingly supporting mechanism 9. The window 207 comprising a through hole and is arranged to allow the laser beam to pass therethrough to form the optical guideline adjacent to the cutting point. The laser cover 202 has a through hole 202a arranged to pass the laser beam therethrough to form the optical guideline on a portion in front (in the cutting direction CD) of the base. The slide cover 201 is accessible through the through hole 202a to selectively shut the window 207.

The slide cover 201 is made of plastic and is attached to a rail 205 to slide along the longitudinal direction of the rail 205.

As shown in FIG. 8, the slide cover 201 has a groove portion 201a capable of covering three surfaces of the rail 205. Thus, the slide cover 201 is attached to laser cover 202 through the rail 205 by fitting the inside the groove portion 201a in the rail 205.

The slide cover 201 has a width and length capable of covering the window 207. Thus, the slide cover 201 can selectively shut the window.

Figure 9:
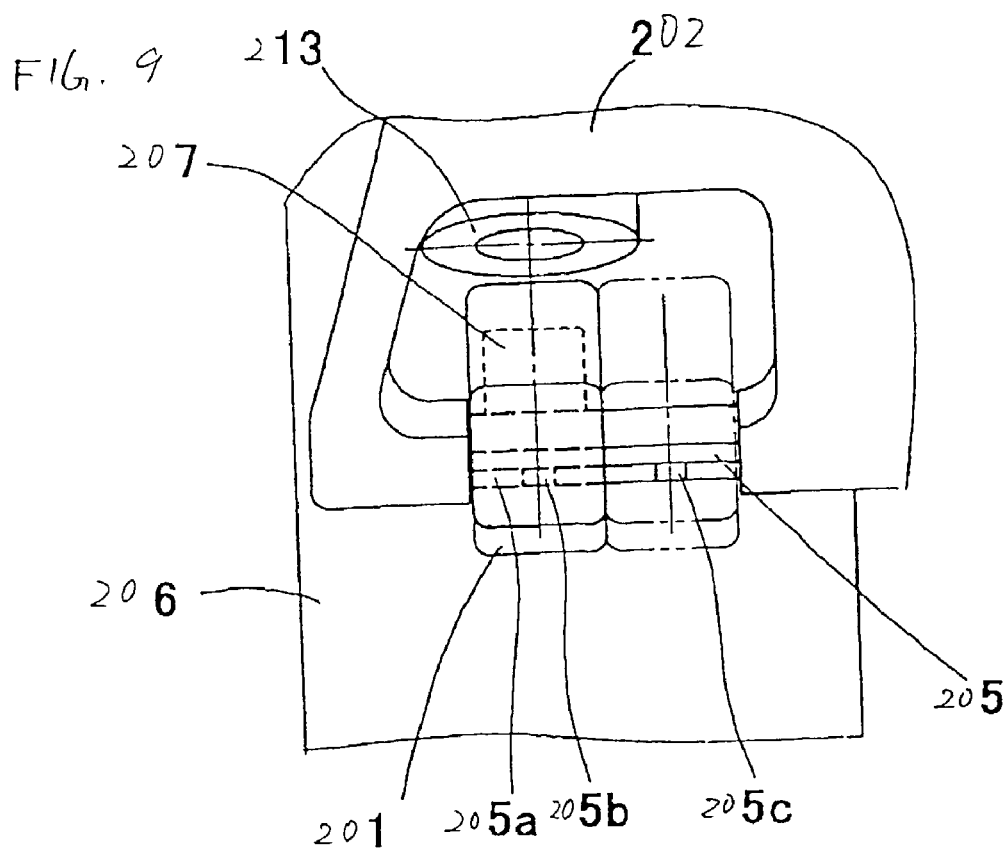
FIG. 9 is a perspective view of the laser emitter and its peripheral portion of the portable circular power saw according to a fifth embodiment shown in the direction A2 in FIG. 8.
Figure 10:
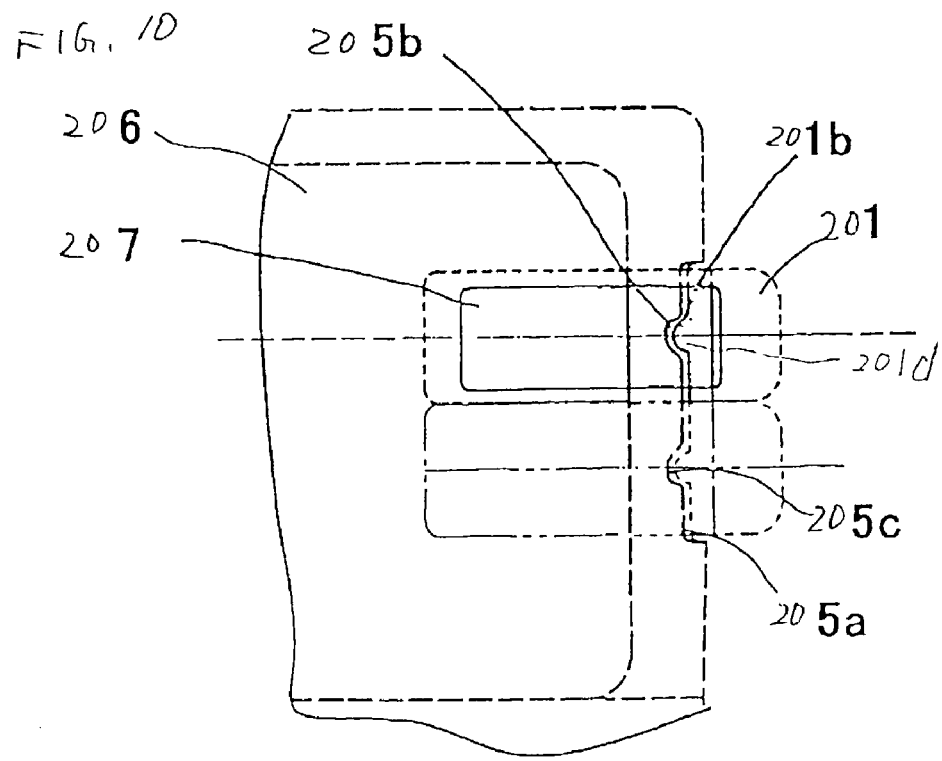
FIG. 10 is a perspective view of the laser emitter and its peripheral portion of the portable circular power saw according to a fifth embodiment shown in the direction B2 in FIG. 8.
Figure 11:
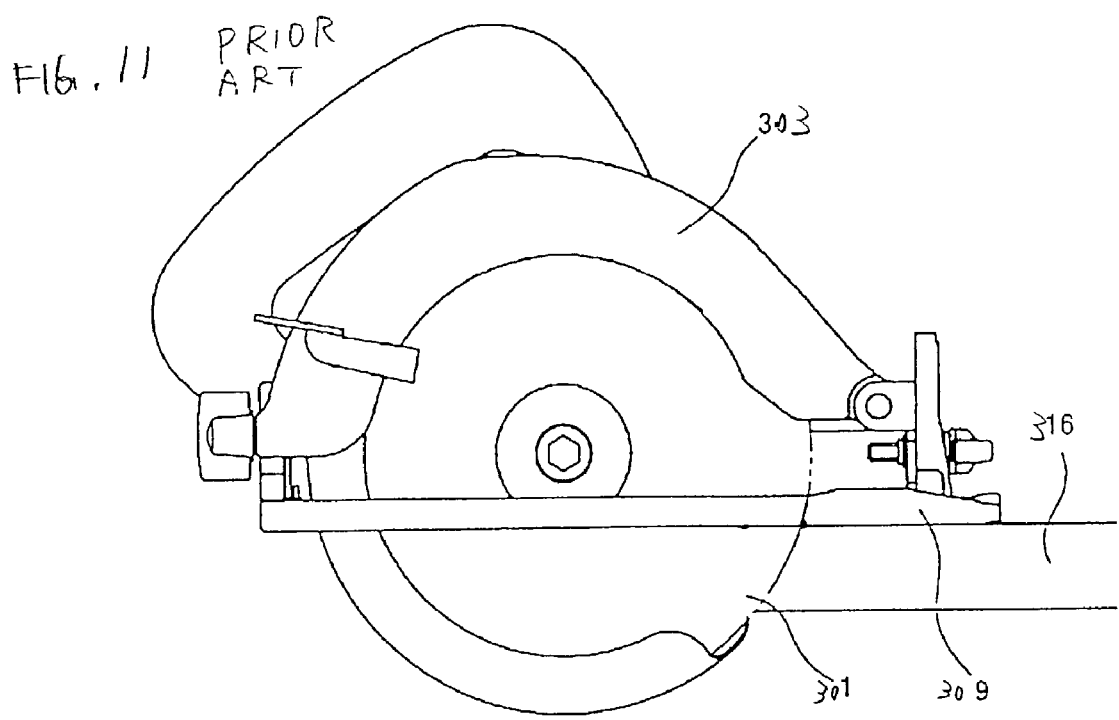
FIGS. 11 and 12 illustrate a prior art portable circular power saw.
Figure 12:
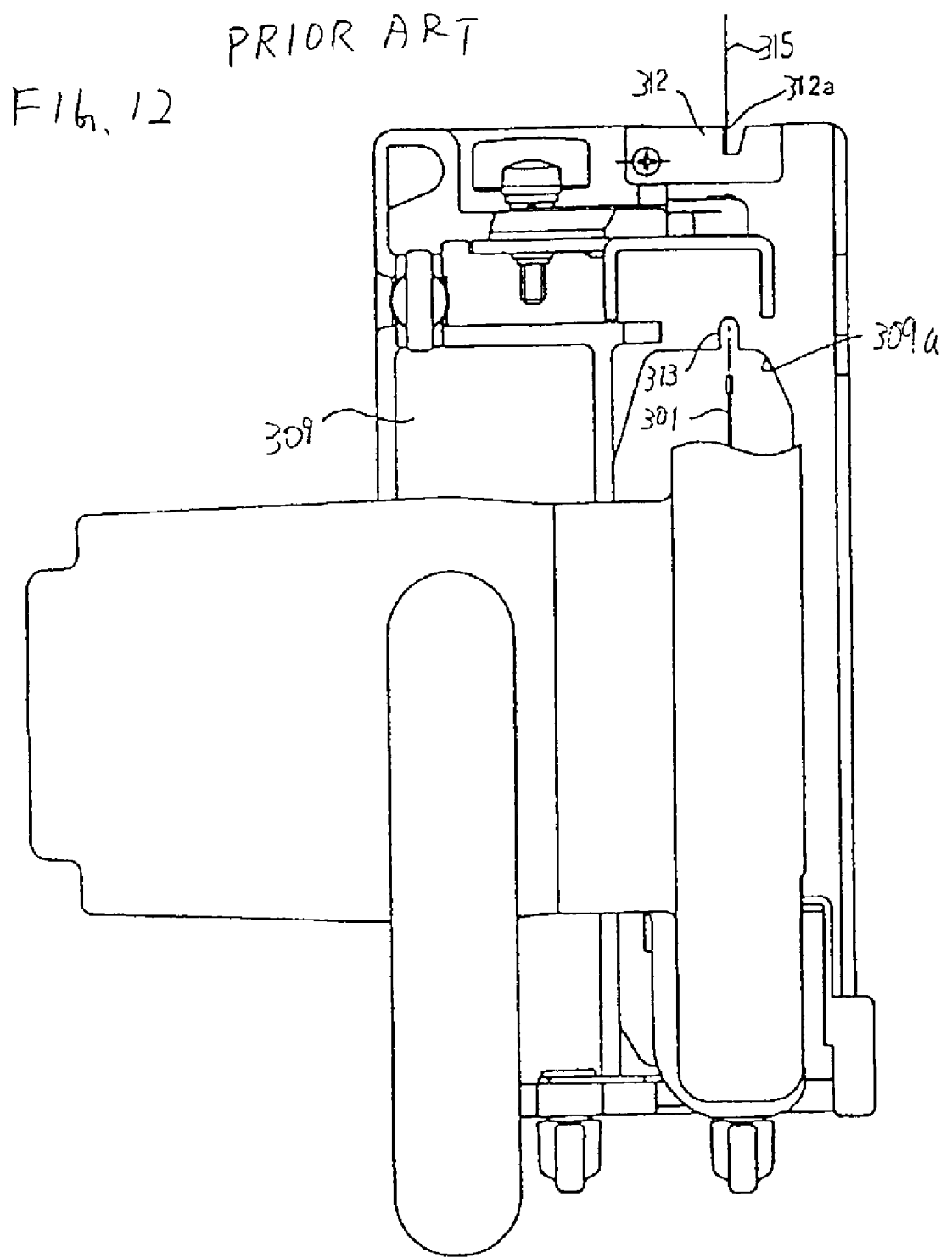
Figure 14A:
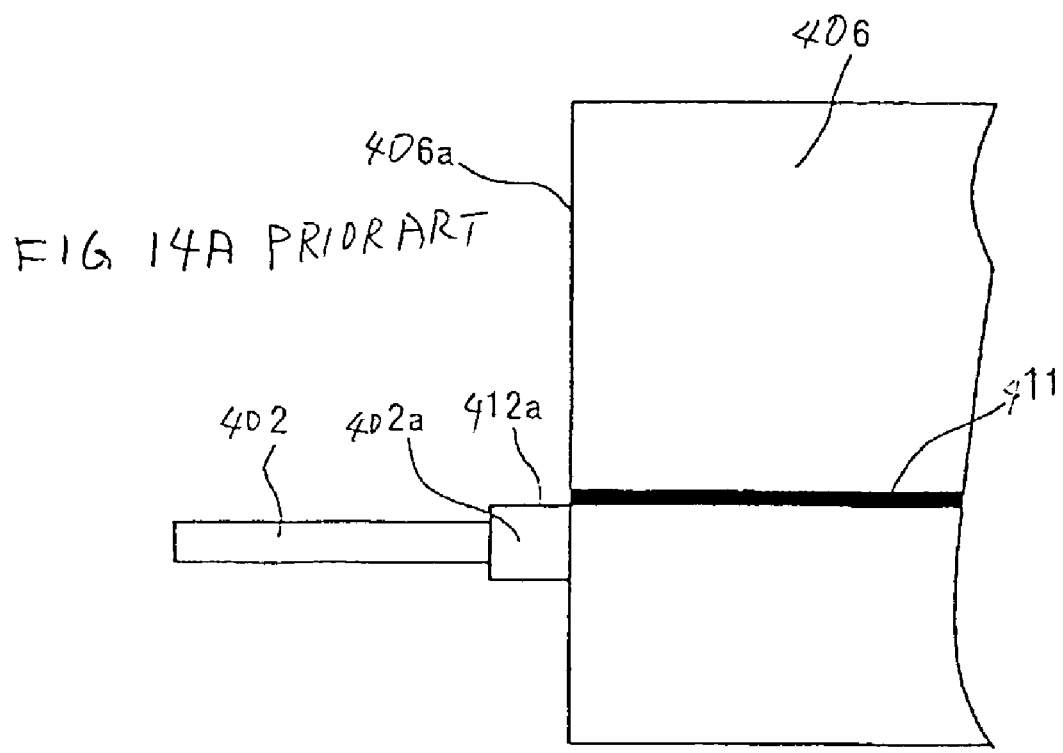
FIGS. 14A and 14B illustrate alignment conditions in another prior art power saw.
Figure 14B:
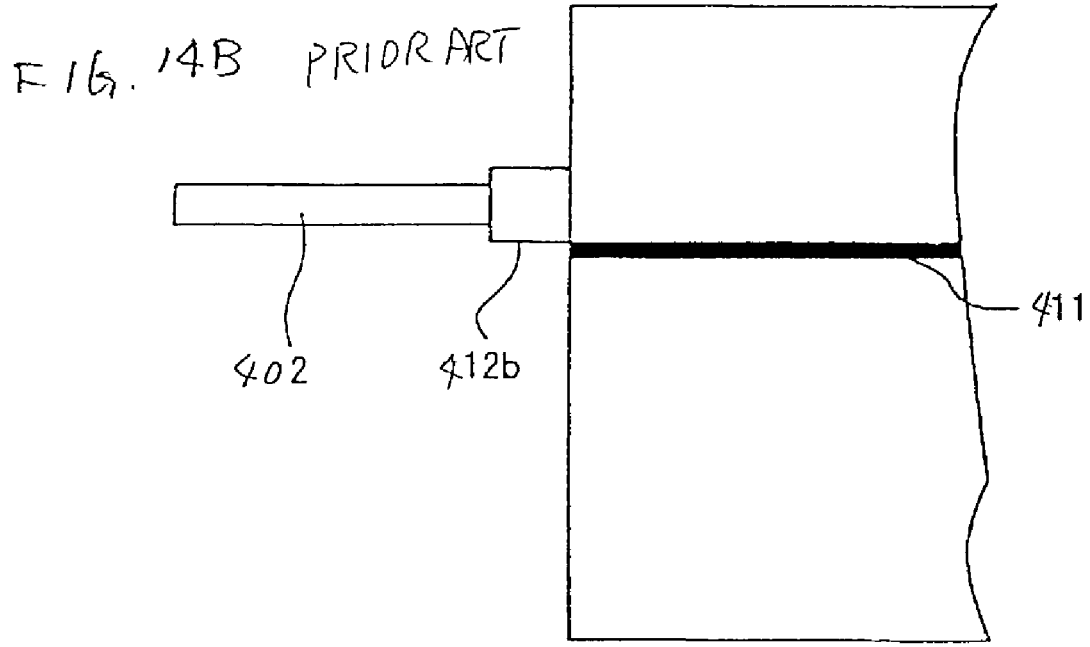

FIG. 9 shows a perspective view of the portion including the slide cover 201 viewed in the direction A2 in FIG. 8. FIG. 10 shows a perspective view of the portion including the slide cover 201 viewed in the direction B2 in FIG. 8.

The slide cover 201 has a protruding guide rail 201b covering a groove 205a in the rail 205. The protruding guide rail 201b fits into the groove 205a to prevent the slide cover 201 from detaching from the rail 205. The protruding guide rail 201b is fitted into the groove 205 through elastic deformation of the slide cover.

The protruding guide rail 201b has a protuberance 201d having a semicircle cross-sectional shape. On the other hand, the groove 205a has notches 205b and 205c having corresponding semicircle cross-sectional shape at the shutter position and the open position of the slide cover 201, respectively.

Thus, the protuberance 201d fitting into the notch 205b in the groove 205a holds the slide cover 201 at the shutter position. On the other hand, the protuberance 201c fitting into the notch 205c in the groove 205a holds the slide cover 201 at the open position. The protuberance 201d and the notches 205b and 205c provide stop positions in sliding action of the slide cover 201 and prevents the slide cover 201 from unintentional movement due to vibration during cutting.

The groove portion 201a is outwardly protruded and is accessible through the 202a. Thus, the operator can access to the groove portion 201a and can slide the slide cover by pushing the groove portion 201 to open or shut the window 207.

The slide cover 201 can be removed from the rail 205 by lifting one end 201e, that is, in FIG. 9, rotating the slide cover 201 around the rail 205 clockwise. On the other hand, the slide cover 201 has a extending portion 201C which limits the rotation of the slide cover 201 to prevent unintentional removal of the slide cover 201.

According to this embodiment, the window 207 is selectively shut or opened in accordance with the cutting condition. More specifically, though a work piece includes much moisture or much resin, the operator can shut the window 207 to protect the laser beam emitting portion 213 during cutting. In this condition, the operator can align the cutting line on the work piece with the optical guideline formed in front of the base.

Moreover, the operator can align the cutting line on the work piece with the optical guideline around the cutting point with the window 207 opened before the start of cutting. Thus, at first, the operator aligns the optical guideline with the cutting line on the work piece, and then, shuts the slide cover 201 before the start of cutting. Accordingly, this structure does not decrease the efficiency in the alignment operation between the cutting line and the optical guideline.

Moreover, the slide cover 201 is detachable, so that the operator can clean the sliding cover 201, if many cutting chips attach to the slide cover 201.

In this embodiment, the slide cover 201 can slide along the rail 205 extending in the rotation axis RA of the saw blade. However, the slide cover may have a sliding mechanism for sliding the cover in the direction perpendicular to the rotational axis RA of the saw blade. Moreover, the slide cover 201 may have a slide mechanism capable of rotational movement of the slide cover 201 at the shutter position and the open position.

Moreover, the slide cover may comprise a transparent plastic member. In this case, the laser beam can be projected at the portion around the cutting point though the slide cover is in the shutter position.

Moreover, the slide cover 201 according to this embodiment is applicable to the first to fourth embodiments.

What is claimed is:

1. A portable circular power saw comprising:
   a housing;
   a motor supported by the housing for rotating a saw blade to cut a work piece;
   a base supported by the housing and having an opening to expose the circular saw blade from the base;
   a saw cover supported by the housing and having a shape so as to cover a portion of the saw blade; and
   a laser emitter supported by the saw cover, being capable of emitting a laser beam to an area away from the saw blade along a cutting direction of the saw blade, and being adjustably shifted along an axial direction defined by a rotation axis of the saw blade,
   wherein the laser emitter emits a first portion of the laser beam passing through a window of the saw cover to an area placed near to a portion of the saw blade by which the work piece is currently cut, and the laser emitter is able to emit a second portion of the laser beam passing outside the window of the saw cover to an area placed in front of the base in the cutting direction.

2. The portable circular power saw as claimed in claim 1, wherein the light projecting means is arranged behind, in the cutting direction, a tangential line of a circumference of the saw blade at an intersection of a bottom surface of the base and the saw blade.

3. The portable circular power saw as claimed in claim 1, further comprising a safety cover rotatably supported around the circumference of the saw blade inside the saw cover to cover the circumference of the saw blade at a lower area of the base, wherein the safety cover has a window for transmitting the first portion of the laser beam from the window of the saw cover therethough.

4. The portable circular power saw as claimed in claim 1, further comprising a shutter for selectively shutting the window of the saw cover.

* * * * *